United States Patent [19]
Kirsch

[11] Patent Number: 5,617,762
[45] Date of Patent: Apr. 8, 1997

[54] MINIATURE POSITIONING DEVICE

[76] Inventor: Jerry Kirsch, 3995 River Rd. #11, East China, Mich. 48054

[21] Appl. No.: 402,473

[22] Filed: Mar. 10, 1995

[51] Int. Cl.⁶ ............................. B25J 17/02; F41G 1/40; H02K 5/00
[52] U.S. Cl. .................... 74/490.06; 248/183.2; 248/183.4; 248/661; 348/143; 348/373; 901/23; 901/29
[58] Field of Search ................. 74/490.03, 490.06, 74/490.07; 248/183.2, 183.4, 661, 913; 343/765; 348/143, 373; 901/23, 29

[56] References Cited

U.S. PATENT DOCUMENTS

| | | | |
|---|---|---|---|
| 1,943,360 | 1/1934 | Arnold | 248/183.4 |
| 4,233,634 | 11/1980 | Adams | 348/373 |
| 4,728,839 | 3/1988 | Coughlan et al. | 248/183.4 X |
| 4,766,775 | 8/1988 | Hodge | 901/23 X |
| 5,028,997 | 7/1991 | Elberbaum | 348/143 |
| 5,314,425 | 5/1994 | Shpigel | 901/23 X |

*Primary Examiner*—Allan D. Herrmann

[57] ABSTRACT

A positioning device (10, 10') including a mounting base (16), a yaw assembly (18) for imparting yaw movement relative to the mounting base (16) and a pitch assembly (22) for imparting pitch movement relative to the mounting base (16) is disclosed. The yaw assembly (18) comprises a yaw table (20) rotatably mounted to the mounting base (16) and the pitch assembly (22) comprises a pitch wheel (24) rotatably mounted to the yaw table (20). The positioning device (10, 10') includes a pitch motor (28) located on the yaw table (20) for rotating the pitch wheel (24) relative to the yaw table (20) and a yaw motor (38) located on the yaw table (20) for rotating the yaw table (20) relative to the mounting base (16).

69 Claims, 4 Drawing Sheets

1

MINIATURE POSITIONING DEVICE

TECHNICAL FIELD

The subject invention relates to positioning devices for positioning an object by transmitting at least yaw and pitch motion to the object.

BACKGROUND ART

Positioning devices find a wide range of commercial applications, such as surveillance, robotics, and aiming of light emitters such as lasers or searchlights, weaponry, antennae, and radar dishes. Linear positioners or actuators are used for push/pull movement of an object while non-linear positioners are used for pitch/tilt, yaw/pan, and roll movement of an object. The most popular and well-known non-linear positioners are robot wrist and arm devices, such as the type found in U.S. Pat. No. 4,686,866 and camera positioning devices, such as the type found in U.S. Pat. No. 5,028,997.

U.S. Pat. No. 4,686,866 discloses a robotic wrist/arm device having mechanical joints located in the wrist of the robot arm for simultaneous pitch, yaw, and roll movement. The drives for the mechanical joints are located externally from the wrist in the robot arm. This design unnecessarily increases the size of the robotic wrist/arm device and unnecessarily increases the moment arms between the drives and the mechanical joints used to impart motion to the object to be positioned.

U.S. Pat. No. 5,028,997 discloses a camera positioning device for imparting yaw/pan and pitch/tilt motion to a camera and lens assembly located in the actuator or wrist of the device. While one of the drives for positioning the camera is located internally within the wrist of the device, the other drive is located externally from the wrist and is mounted to a base. Again, the externally located second drive unnecessarily increases the size of the camera positioning device.

Accordingly, one of the objects of the present invention is to provide a positioning device which imparts at least yaw and pitch movement to an object wherein the drives are located internally within the wrist or actuator to miniaturize the positioning device as much as possible.

SUMMARY OF THE INVENTION AND ADVANTAGES

The apparatus of the present invention is a positioning device for positioning an object. The positioning device comprises a mounting base and a yaw assembly for imparting yaw movement relative to the mounting base wherein the yaw assembly comprises a yaw table rotatably mounted to the mounting base. The positioning device further comprises a pitch assembly for imparting pitch movement relative to the mounting base wherein the pitch assembly comprises a pitch wheel rotatably mounted to the yaw table. The positioning device further comprises a pitch drive located on the yaw table for rotating the pitch wheel relative to the yaw table and a yaw drive located on the yaw table for rotating the yaw table relative to the mounting base.

The main advantage of the present invention over the prior art is the decreased size and weight of a positioning device made possible by locating all the drives within the wrist portion of the device.

Another advantage of the present invention over the prior art is the decrease in the moment arm extending between the drives and the object to be positioned made possible again by locating all the drives within the wrist portion of the device.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
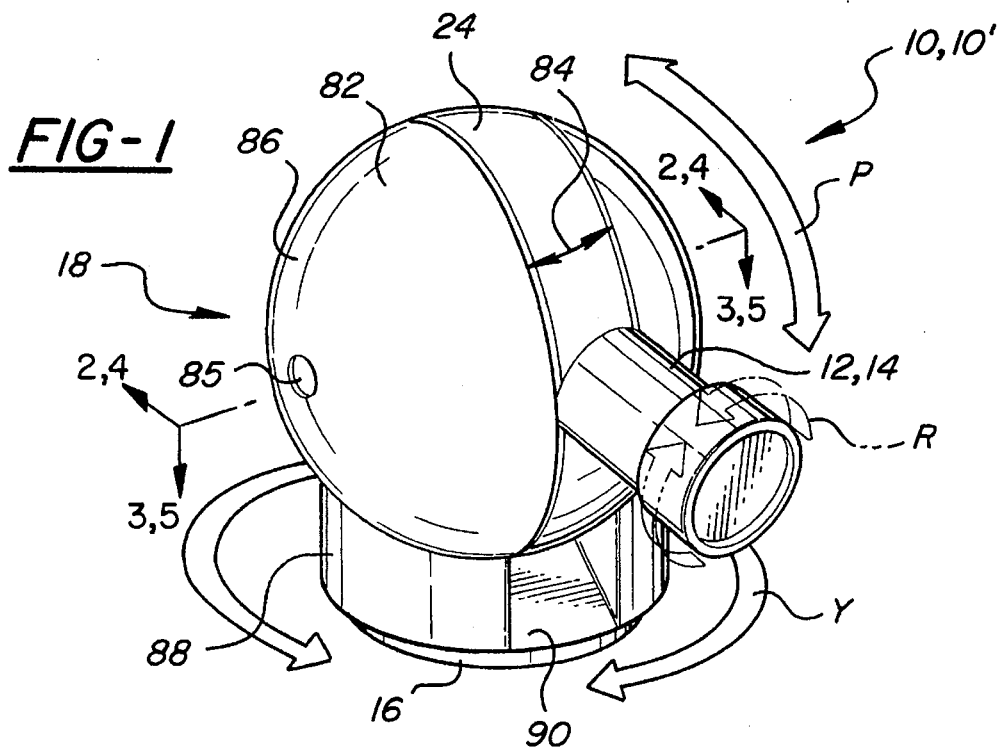
FIG. 1 is a perspective view of the positioning device of the present invention.
Figure 3:
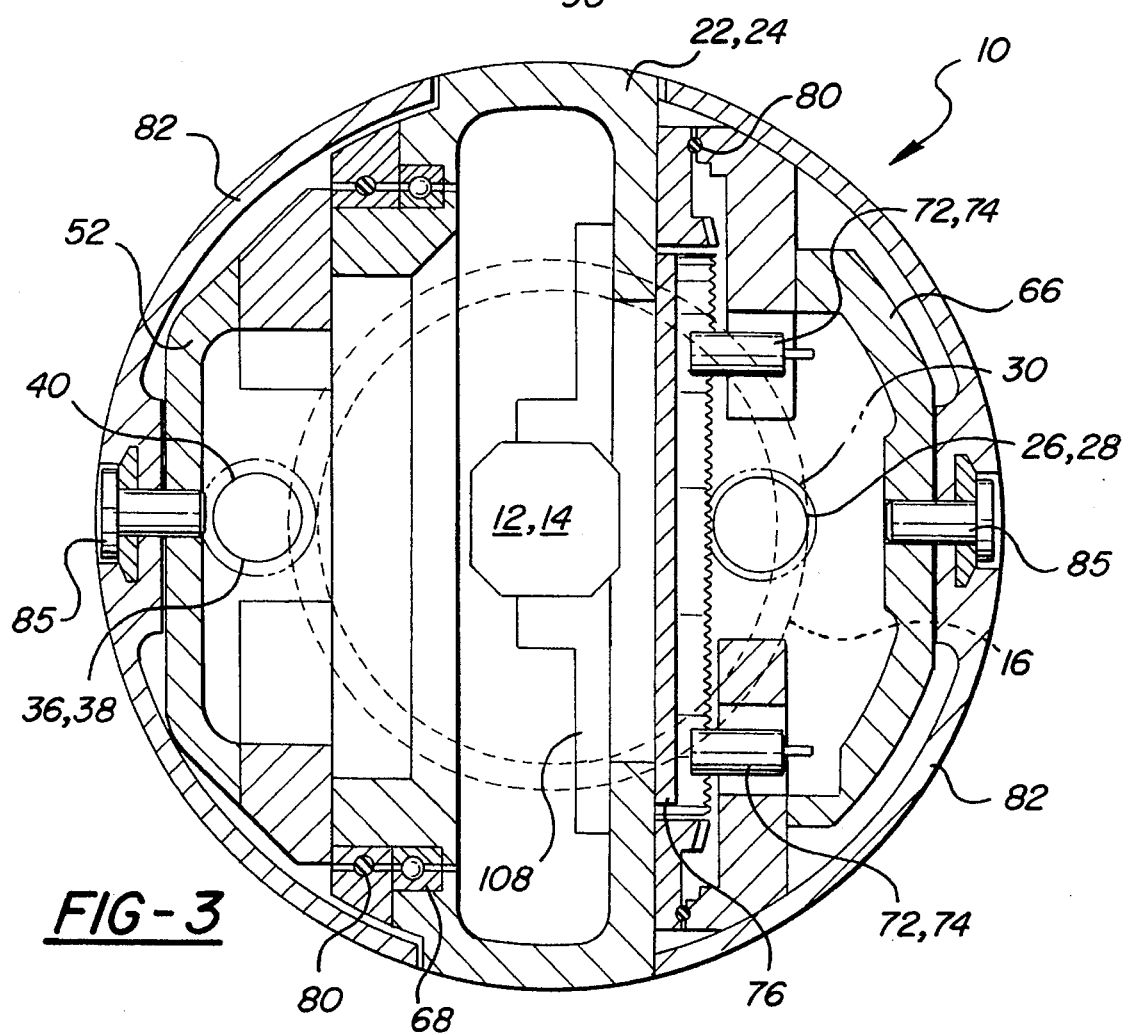
FIG. 3 is a cross-sectional view of the positioning device taken about line 3—3 in FIG. 1.
Figure 2:
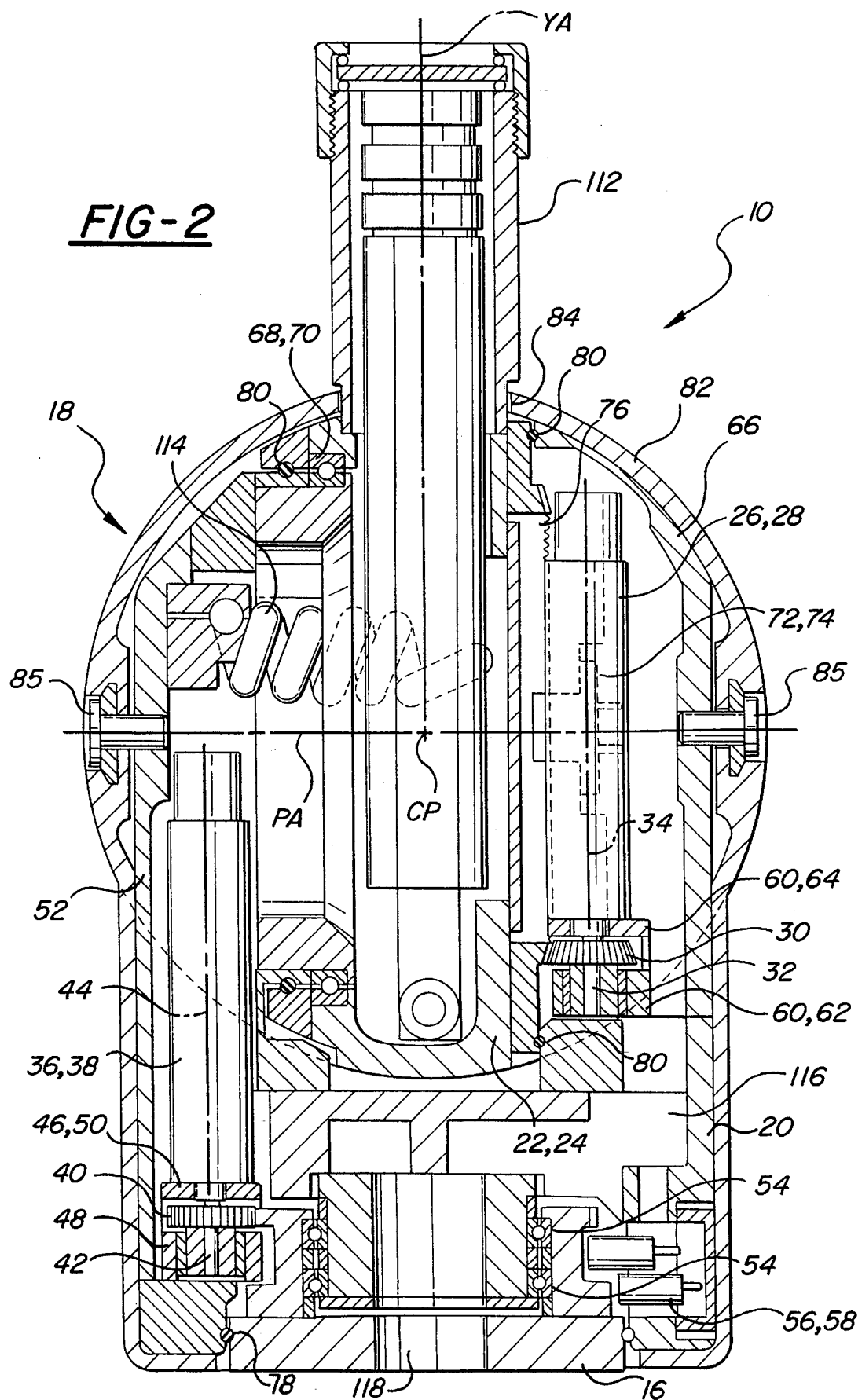
FIG. 2 is a cross-sectional view of the positioning device taken about line 2—2 in FIG. 1.
Figure 4:
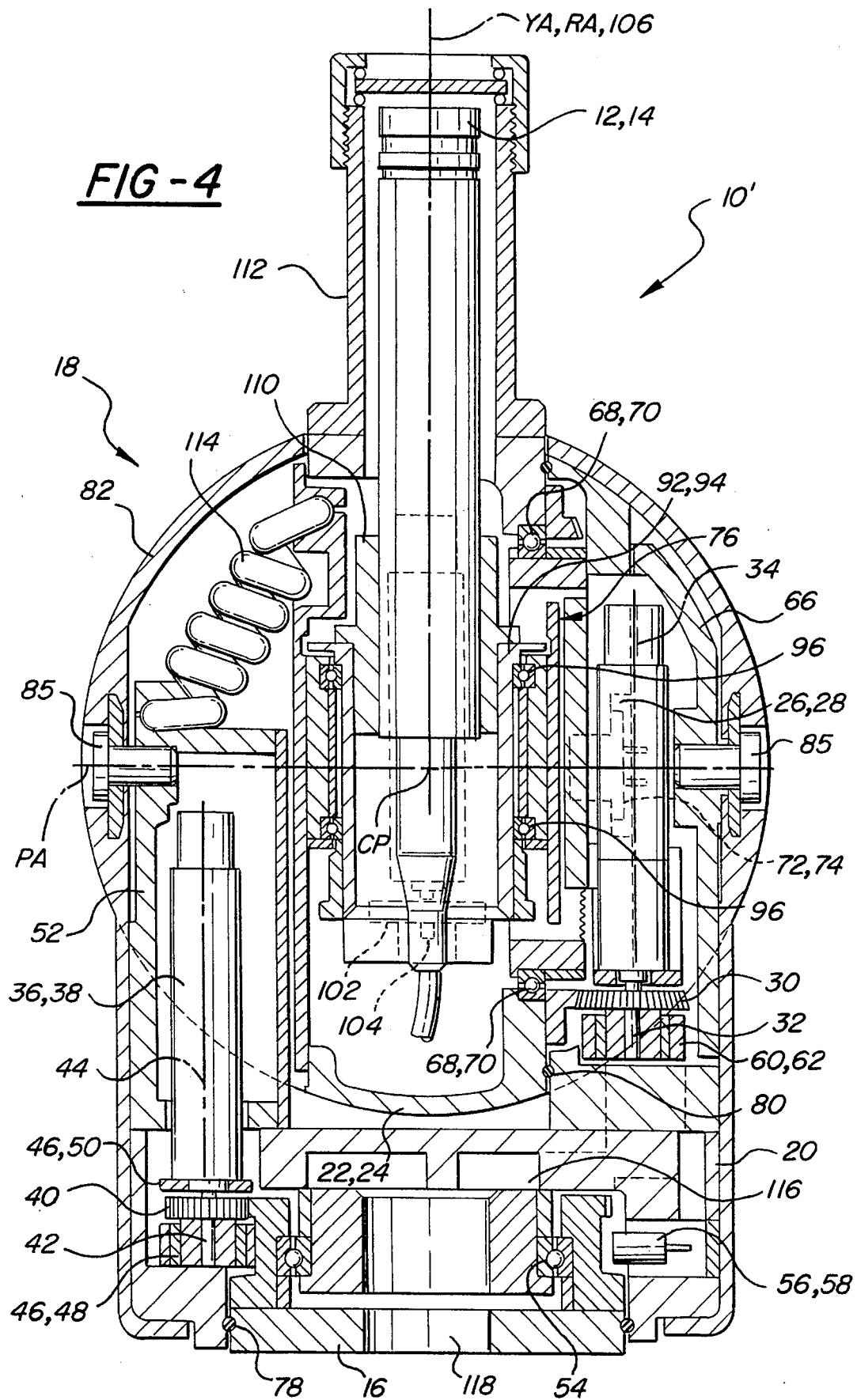
FIG. 4 is a cross-sectional view of a second embodiment of the positioning device taken about line 4—4 in FIG. 1.
Figure 5:
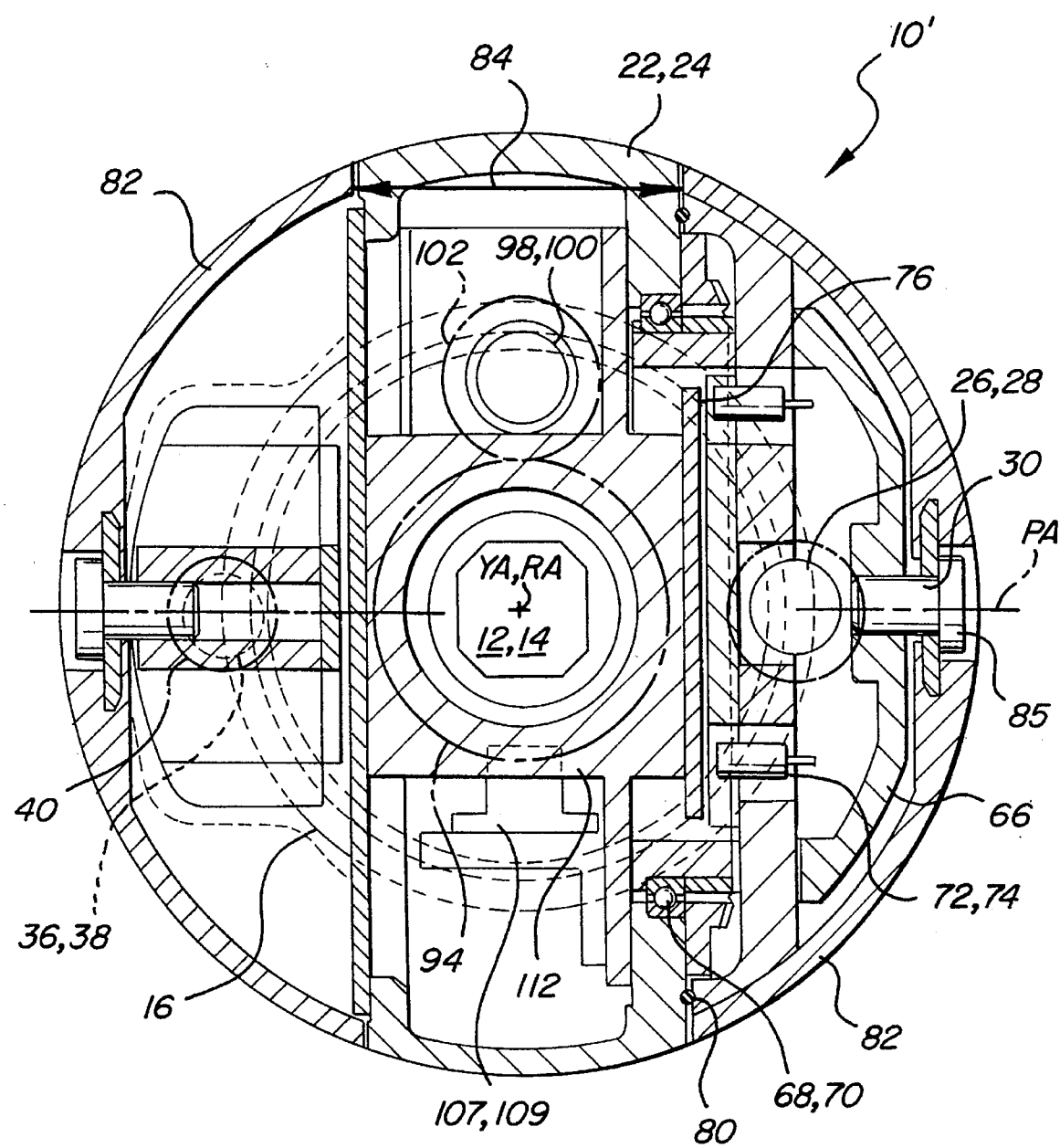
FIG. 5 is a cross-sectional view of the second embodiment of the positioning device taken about line 5—5 in FIG. 1

Referring to FIG. 1, the positioning device 10, 10' of the present invention is shown. The positioning device 10, 10' can be used to position or aim an object 12 including, but not limited to, a camera and lens assembly 14. The positioning device 10, 10' is capable of three hundred and sixty degrees of yaw/pan motion as indicated by arrow Y, and at least two hundred and seventy degrees of pitch/tilt motion as indicated by arrow P. As will be described latter, the positioning device 10 may be modified so as to provide three hundred and sixty degrees of roll motion as indicated by phantom arrow R. FIGS. 1–3 show the positioning device 10 capable of only yaw and pitch motion whereas FIGS. 1, 4 and 5 illustrate the modified second version or embodiment of the positioning device 10' capable of yaw, pitch, and roll motions.

Referring to FIGS. 1–3, the positioning device 10 comprises a mounting base 16 for mounting or fixing the positioning device 10 to or upon a body such as a wall, a ceiling, a roof, a pole, a robotic arm end effectuator, a plane, a boat, an automobile or other vehicles (not shown). The positioning device 10 further comprises a yaw assembly 18 for imparting yaw movement relative to the mounting base 16. As seen in FIG. 2 only, yaw assembly 18 includes a yaw table 20 rotatably mounted to the mounting base 16. As can be seen in FIGS. 2 and 3, the positioning device 10 further includes a pitch assembly 22 for imparting pitch movement relative to the mounting base 16. The pitch assembly 22 comprises a pitch member or wheel 24 rotatably mounted to the yaw table 20. As seen in FIG. 2, the yaw table 20 rotates relative to the mounting base 16 around a first yaw axis YA extending in a first direction. The pitch wheel 24 rotates relative to the yaw table 20 around a second pitch axis PA intersecting the first yaw axis YA and extending in a second direction different from the first direction. Preferably, first yaw axis YA is perpendicular to the second pitch axis PA.

The positioning device 10 further includes a pitch drive means 26 located on the yaw table 20 for rotating the pitch wheel 24 relative to the yaw table 20. Preferably, pitch drive means 26 comprises pitch motor 28 for receiving energy and converting the energy to mechanical motion and pitch actuator 30 operatively associated with the pitch motor 28 for rotating the pitch wheel 24 relative to the yaw table 20. As seen in FIG. 2, the pitch actuator 30 comprises a pitch shaft 32 rotatably coupled to the pitch motor 28 for rotation about an axis 34 parallel to the first yaw axis YA.

The positioning device further includes yaw drive means 36 located on the yaw table 20 for rotating the yaw table 20 relative to the mounting base 16. Yaw drive means 36 comprises yaw motor 38 for receiving energy and converting energy to mechanical motion and yaw actuator 40 operatively associated with the yaw motor 38 for rotating the yaw table 20 relative to the mounting base 16. As seen in FIG. 2, the yaw actuator 40 comprises a yaw shaft 42 rotatably coupled to the yaw motor 38 for rotation about an axis 44 parallel to the first yaw axis YA and axis 34.

Still referring to FIG. 2, the yaw assembly 18 further includes yaw drive mounting means 46 for mounting the yaw motor 38 to the yaw table 20. Yaw drive mounting means 46 includes a yaw thrust bearing 48 and a yaw motor retainer 50. The yaw assembly 18 further includes a yaw assembly cover 52 for covering the yaw motor 38 and yaw bearings 54 disposed between the mounting base 16 and the yaw table 20 for rotatably coupling the yaw table 20 to the mounting base 16. The yaw assembly 18 further comprises yaw sensor means 56 for detecting the position of the yaw table 20 relative to the mounting base 16. Yaw sensor means 56 may include one or more photo-optical devices 58.

Referring to FIGS. 2 and 3, the pitch assembly 22 further includes pitch drive mounting means 60 comprising a pitch thrust bearing 62 and a pitch motor retainer 64. The pitch assembly 22 further includes a pitch assembly cover 66 for covering the pitch motor 28 and pitch wheel mounting means 68 for mounting the pitch wheel 24 to the yaw table 20. Pitch wheel mounting means 68 includes pitch bearing 70 for rotatably coupling the pitch wheel 24 to the yaw table 20. The pitch assembly 22 further comprises pitch sensor means 72 for detecting the position of the pitch wheel 24 relative to the yaw table 20. Pitch sensor means 72 may include one or more photo-optical devices 74 and a photo sensor read disk 76 operatively associated with each of the photo-optical devices 74.

The positioning device 10 further comprises yaw sealing means 78, such as a rubber gasket or "O" ring, disposed between the mounting base 16 and the yaw assembly 18 for preventing the passage of fluids between the mounting base 16 and the yaw assembly 18. The positioning device further comprises pitch sealing means 80, such as a rubber gasket or "O" ring, disposed between the pitch assembly 22 and the yaw assembly 18 for preventing the passage of fluids between the pitch and yaw assemblies 18, 22.

The positioning device 10 may also include an outer cover 82 for covering the pitch and yaw assemblies 18, 22. The outer cover 82 includes a spherical portion 86 and a cylindrical portion 88. The yaw table 20 includes a slotted recess 90 for increasing the range of pitch movement imparted by the pitch assembly 18. The outer cover 82 further includes a pitch wheel opening 84 which extends around the spherical portion 86 and into the cylindrical portion 88 to allow an object 12 extending therethrough to be pitched about pitch axis PA. Cover screws 85 are used to mount the outer cover 82 to the pitch assembly cover 66 and yaw assembly cover 52.

The second embodiment of the positioning device 10' is shown in FIGS. 1, 4, and 5 wherein reference numerals used in the description of the first embodiment 10 as shown in FIGS. 1–3 indicate like parts. The positioning device 10' further comprises a roll assembly 92 for imparting roll movement relative to the mounting base 16 and pitch assembly 22. The roll assembly 92 comprises a roll member 94 rotatably mounted to the pitch wheel 24. The roll assembly 92 further includes roll member mounting means 96 for mounting the roll member 94 to the pitch wheel 24. The roll member mounting means 96 preferably includes roll bearings for rotatably coupling the roll member 94 to the pitch wheel 24.

The positioning device 10' further comprises roll drive means 98 located on the pitch wheel 24 for rotating the roll member 94 relative to the pitch wheel 24. Roll drive means 98 comprises roll motor 100 for receiving energy and converting energy to mechanical motion and roll actuator 102 operatively associated with the roll motor 100 for rotating the roll member 94 relative to the pitch wheel 24. The roll actuator 102 comprises a roll shaft 104 rotatably coupled to the roll motor 100 for rotation about an axis 106 parallel to the first yaw axis YA and axes 34, 44. The roll member 94 rotates relative to the pitch wheel 24 about a third roll axis RA intersecting the first yaw and second pitch axes YA, PA and extending in a third direction. Preferably, third roll axis RA is perpendicular to first yaw and second pitch axes YA, PA. Preferably, first yaw axis YA, second pitch axis PA, and third roll axis RA intersect at a centerpoint CP so that rotation of object 12 is about centerpoint point CP. Referring to FIG. 5, the roll assembly 92 further comprises roll sensor means 107 for detecting the position of the roll member 94 relative to the yaw table 20 and pitch wheel 24. Roll sensor means 107 may include one or more photo-optical devices 109.

In the first embodiment, the positioning device 10 includes a first object mounting bracket 108 for mounting the object or camera and lens assembly 12, 14 to the pitch wheel 24. In the second embodiment of the positioning device 10', the object or camera and lens assembly 12, 14 is mounted to the roll member 94 of the roll assembly 92 via a second object mounting bracket 110. It will be appreciated that many various methods for mounting the object or camera and lens assembly 12, 14 to the positioning devices 10, 10' may be employed. The positioning device 10' further comprises a camera and lens assembly cover 112 extending from the pitch wheel 24 for covering and sealing the camera and lens assembly 112 from fluids.

The positioning devices 10, 10' further include at least one insulated electrical conductor 114 electrically connected to the pitch, yaw, and roll motors 28, 38, 100 for communication therewith. The positioning devices 10, 10' further include passageway means 116 for allowing the electrical conductors 114 to pass through and out of the positioning devices 10, 10'. Passageway means 116 may comprise of a mounting base aperture 118 through which electrical conductors 114 pass.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A positioning device (10, 10') for positioning an object (12), said positioning device (10, 10') comprising:
   a mounting base (16);
   a yaw assembly (18) for imparting yaw movement relative to said mounting base (16), said yaw assembly (18) comprising a yaw table (20) rotatably mounted to said mounting base (16);
   a pitch assembly (22) for imparting pitch movement relative to said mounting base (16), said pitch assembly (22) comprising a pitch wheel (24) adapted for mounting to the object (12) and rotatably mounted to said yaw table (20);
   pitch drive means (26) located on said yaw table (20) for rotating said pitch wheel (24) relative to said yaw table (20), said pitch drive means (26) including a pitch motor (28) coupled to said yaw table (20) such that said pitch motor (28) rotates with table yaw table second pitch axis (PA); and
   yaw drive means (36) located on said yaw table (20) for rotating said yaw table (20) relative to said mounting base (16), said yaw drive means (36) including a yaw motor (38) coupled to said yaw table (20) such that said yaw motor (38) rotates with said yaw table (20) around a first yaw axis (YA) that intersects the center of said pitch wheel (24) and said second pitch axis (PA) to define a center point (CP) about which the object (12) is positioned.

2. The positioning device (10') set forth in claim 1 further comprising a roll assembly (92) for imparting roll movement relative to said mounting base (16), said roll assembly (92) comprising a roll member (94) rotatably mounted to said pitch wheel (24).

3. The positioning device (10') set forth in claim 2 further comprising roll member mounting means (96) for mounting said roll member (94) to said pitch wheel (24).

4. The positioning device (10') set forth in claim 3 wherein said roll member mounting means (96) includes roll bearings (96) for rotatably coupling said roll member (94) to said pitch wheel (24).

5. The positioning device (10') set forth in claim 2 further comprising roll drive means (98) located on said pitch wheel (24) for rotating said roll member (94) relative to said pitch wheel (24).

6. The positioning device (10') set forth in claim 5 wherein said roll member (94) rotates relative to said pitch wheel (24) about a third roll axis (RA) intersecting said first yaw and second pitch axes (YA, PA) at said centerpoint (CP) and extending in a third direction.

7. The positioning device (10') set forth in claim 6 wherein said roll drive means (98) comprises roll motor means (100) for receiving energy and converting said energy to mechanical motion and roll actuator means (102) operatively associated with said roll motor means (100) for rotating said roll member (94) relative to said pitch wheel (24).

8. The positioning device (10') set forth in claim 7 wherein said roll actuator means (102) comprises a roll shaft (104) rotatably coupled to said roll motor means (98) for rotation about an axis parallel to said first yaw axis (YA).

9. The positioning device (10, 10') set forth in claim 1 wherein said yaw drive means (36) further comprises yaw actuator means (40) operatively associated with said yaw motor (38) for rotating said yaw table (20) relative to said mounting base (16).

10. The positioning device (10, 10') set forth in claim 9 wherein said yaw actuator means (40) comprises a yaw shaft (42) rotatably coupled to said yaw motor (38) for rotation about an axis parallel (44) to said first yaw axis (YA).

11. The positioning device (10, 10') set forth in claim 1 wherein said pitch drive means (26) further comprises pitch actuator means (30) operatively associated with said pitch motor (28) for rotating said pitch wheel (24) relative to said yaw table (20).

12. The positioning device (10, 10') set forth in claim 11 wherein said pitch actuator means (30) comprises a pitch shaft (32) rotatably coupled to said pitch motor means (28) for rotation about an axis (34) parallel to said first yaw axis (YA).

13. The positioning device (10, 10') set forth in claim 1 further comprising yaw sealing means (78) disposed between said mounting base (16) and said yaw assembly (18) for preventing the passage of fluids between said mounting base (16) and said yaw assembly (18).

14. The positioning device (10, 10') set forth in claim 1 further comprising pitch sealing means (80) disposed between said pitch assembly (22) and said yaw assembly (18) for preventing the passage of fluids between said pitch and yaw assemblies (22, 18).

15. The positioning device (10, 10') set forth in claim 1 wherein said yaw assembly (18) includes yaw drive mounting means (46) for mounting said yaw drive means (36) to said yaw table (20).

16. The positioning device (10, 10') set forth in claim 15 wherein said yaw drive mounting means (46) includes a yaw thrust bearing (48).

17. The positioning device (10, 10') set forth in claim 1 wherein said yaw assembly (18) includes a yaw assembly cover (52) for covering said yaw drive means (36).

18. The positioning device (10, 10') set forth in claim 1 further comprising yaw bearings (54) disposed between said mounting base (16) and said yaw table (20) for rotatably coupling said yaw table (20) to said mounting base (16).

19. The positioning device (10, 10') set forth in claim 1 wherein said pitch assembly (22) further includes pitch drive mounting means (60) for mounting said pitch drive means (26) to said yaw table (20).

20. The positioning device (10, 10') set forth in claim 19 wherein said pitch drive mounting means (60) includes a pitch thrust bearing (62).

21. The positioning device (10, 10') set forth in claim 1 wherein said pitch assembly (22) includes a pitch assembly cover (66) for covering said pitch drive means (26).

22. The positioning device (10, 10') set forth in claim 1 further comprising pitch wheel mounting means (68) for mounting said pitch wheel (24) to said yaw table (20).

23. The positioning device (10, 10') set forth in claim 22 wherein said pitch wheel mounting means (68) includes pitch bearings (70) for rotatably coupling said pitch wheel (24) to said yaw table (20).

24. The positioning device (10, 10') set forth in claim 1 further comprising yaw sensor means (56) for detecting the position of said yaw table (20) relative to said mounting base (16).

25. The positioning device (10, 10') set forth in claim 24 wherein said yaw sensor means (56) includes at least one photo-optical device (58).

26. The positioning device (10, 10') set forth in claim 1 further comprising pitch sensor means (72) for detecting the position of said pitch wheel (24) relative to said yaw table (20).

27. The positioning device (10, 10') set forth in claim 26 wherein said pitch sensor means (72) includes at least one photo-optical device (74).

28. The positioning device (10, 10') set forth in claim 27 wherein said pitch sensor means (72) further includes a photo sensor read disk (76) operatively associated with each of said photo-optical devices (74).

29. The positioning device (10, 10') set forth in claim 1 further comprising an outer cover (82) for covering said pitch and yaw assemblies (18, 22).

30. The positioning device (10, 10') set forth in claim 29 wherein said outer cover (82) includes a pitch wheel opening (84).

31. The positioning device (10, 10') set forth in claim 30 wherein said outer cover (82) includes a spherical portion (86).

32. The positioning device (10, 10') set forth in claim 1 wherein said yaw table (20) includes a slotted recess (90) for increasing the range of pitch movement imparted by said pitch assembly (22).

33. The positioning device (10, 10') set forth in claim 2 further comprising roll sensor means (107) for detecting the position of said roll member (94) relative to said yaw table (20) and said pitch wheel (24).

34. The positioning device (10, 10') set forth in claim 33 wherein said roll sensor means (107) includes at least one photo-optical device (109).

35. A positioning device (10, 10') for positioning a camera and lens assembly (14), said positioning device (10, 10') comprising:

a mounting base (16);

a yaw assembly (18) for imparting yaw movement relative to said mounting base (16), said yaw assembly (18) comprising a yaw table (20) rotatably mounted to said mounting base (16);

a pitch assembly (22) for imparting pitch movement relative to said mounting base (16), said pitch assembly (22) comprising a pitch wheel (24) adapted for mounting to the object (12) and rotatably mounted to said yaw table (20);

a camera and lens assembly (14) mounted to said pitch wheel (24);

pitch drive means (26) located on said yaw table (20) for rotating said pitch wheel (24) relative to said yaw table (20), said pitch drive means (26) including a pitch motor (28) coupled to said yaw table (20) such that said pitch motor (28) rotates with said yaw table (20) around a second pitch axis (PA); and yaw drive means (36) located on said yaw table (20) for rotating said yaw table (20) relative to said mounting base (16), said yaw drive means (36) including a yaw motor (38) coupled to said yaw table (20) such that said yaw motor (38) rotates with said yaw table (20) around a first yaw axis (YA) that intersects the center of said pitch wheel (24) and said second pitch axis (PA) to define a center point (CP) about which the object (12) is positioned.

36. The positioning device (10') set forth in claim 35 wherein said camera and lens assembly (14) is mounted to a roll assembly (92) for imparting roll movement relative to said mounting base (16), said roll assembly (92) comprising a roll member (94) rotatably mounted to said pitch wheel (24).

37. The positioning device (10') set forth in claim 36 further comprising roll member mounting means (96) for mounting said roll member (94) to said pitch wheel (24).

38. The positioning device (10') set forth in claim 37 wherein said roll member mounting means (96) includes roll bearings (96) for rotatably coupling said roll member (94) to said pitch wheel (24).

39. The positioning device (10') set forth in claim 36 further comprising roll drive means (98) positioned on said pitch wheel (24) for rotating said roll member (94) relative to said pitch wheel (24).

40. The positioning device (10') set forth in claim 39 wherein said roll member (94) rotates relative to said pitch wheel (24) about a third roll axis (RA) intersecting said first yaw and second pitch axes (YA, PA) and extending in a third direction.

41. The positioning device (10') set forth in claim 40 wherein said roll drive means (98) comprises roll motor means (100) for receiving energy and converting said energy to mechanical motion and roll actuator means (102) operatively associated with said roll motor means (100) for rotating said roll member (94) relative to said pitch wheel (24).

42. The positioning device (10') set forth in claim 41 wherein said roll actuator means comprises a roll shaft rotatably coupled to said roll motor means for rotation about an axis parallel to said first yaw axis.

43. The positioning device (10, 10') set forth in claim 35 wherein said yaw drive means (36) comprises yaw motor means (38) for receiving energy and converting said energy to mechanical motion and yaw actuator means (46) operatively associated with said yaw motor means (38) for rotating said yaw table (20) relative to said mounting base (16).

44. The positioning device (10, 10') set forth in claim 43 wherein said yaw actuator means (40) comprises a yaw shaft (42) rotatably coupled to said yaw motor means (38) for rotation about an axis (44) parallel to said first yaw axis (YA).

45. The positioning device (10, 10') set forth in claim 35 wherein said pitch drive means (26) comprises pitch motor means (28) for receiving energy and converting said energy to mechanical motion and pitch actuator means (30) operatively associated with said pitch motor means (28) for rotating said pitch wheel (24) relative to said yaw table (20).

46. The positioning device (10, 10') set forth in claim 45 wherein said pitch actuator means (30) comprises a pitch shaft (32) rotatably coupled to said pitch motor means (28) for rotation about an axis parallel (34) to said first yaw axis (YA).

47. The positioning device (10, 10') set forth in claim 35 further comprising yaw sealing means (78) disposed between said mounting base (16) and said yaw assembly (18) for preventing the passage of fluids between said mounting base (16) and said yaw assembly (18).

48. The positioning device (10, 10') set forth in claim 35 further comprising pitch sealing means (80) disposed between said pitch assembly (22) and said yaw assembly (18) for preventing the passage of fluids between said pitch and yaw assemblies (22, 18).

49. The positioning device (10, 10') set forth in claim 35 further comprising a camera and lens assembly cover (112) extending from said pitch wheel (24) for covering said camera and lens assembly (14).

50. The positioning device (10, 10') set forth in claim 35 wherein said yaw assembly (18) includes yaw drive mounting means (46) for mounting said yaw drive means (36) to said yaw table (20).

51. The positioning device (10, 10') set forth in claim 50 wherein said yaw drive mounting means (46) includes a yaw thrust bearing (48).

52. The positioning device (10, 10') set forth in claim 35 wherein said yaw assembly (18) includes a yaw assembly cover (52) for covering said yaw drive means (36).

53. The positioning device (10, 10') set forth in claim 35 further comprising yaw bearings (54) disposed between said mounting base (16) and said yaw table (20) for rotatably coupling said yaw table (20) to said mounting base (16).

54. The positioning device (10, 10') set forth in claim 35 wherein said pitch assembly (26) further includes pitch drive mounting means (60) for mounting said pitch drive means (26) to said yaw table (20).

55. The positioning device (10, 10') set forth in claim 54 wherein said pitch drive mounting means (60) includes a pitch thrust bearing (62).

56. The positioning device (10, 10') set forth in claim 35 wherein said pitch assembly (22) includes a pitch assembly cover (66) for covering said pitch drive means (26).

57. The positioning device (10, 10') set forth in claim 38 further comprising pitch wheel mounting means (68) for mounting said pitch wheel (24) to said yaw table (20).

58. The positioning device (10, 10') set forth in claim 57 wherein said pitch wheel mounting means (68) includes pitch bearings (70) for rotatably coupling said pitch wheel (24) to said yaw table (20).

59. The positioning device (10, 10') set forth in claim 35 further comprising yaw sensor means (56) for detecting the position of said yaw table (20) relative to said mounting base (16).

60. The positioning device (10, 10') set forth in claim 59 wherein said yaw sensor means (56) includes at least one photo-optical device (58).

61. The positioning device (10, 10') set forth in claim 35 further comprising pitch sensor means (72) for detecting the position of said pitch wheel (24) relative to said yaw table (20).

62. The positioning device (10, 10') set forth in claim 61 wherein said pitch sensor means (72) includes at least one photo-optical device (74).

63. The positioning device (10, 10') set forth in claim 62 wherein said pitch sensor means (72) further includes a photo sensor read disk (96) operatively associated with each of said photo-optical devices (74).

64. The positioning device (10, 10') set forth in claim 35 further comprising an outer cover (82) for covering said pitch and yaw assemblies (22, 18).

65. The positioning device (10, 10') set forth in claim 64 wherein said outer cover (82) includes a pitch wheel opening (84).

66. The positioning device (10, 10') set forth in claim 65 wherein said outer cover (82) includes a spherical portion (86).

67. The positioning device (10, 10') set forth in claim 35 wherein said yaw table (20) includes a slotted recess (90) for increasing the range of pitch movement imparted by said pitch assembly (18).

68. The positioning device (10, 10') set forth in claim 36 further comprising roll sensor means (107) for detecting the position of said roll member (94) relative to said yaw table (20) and said pitch wheel (24).

69. The positioning device (10, 10') set forth in claim 68 wherein said roll sensor means (107) includes at least one photo-optical device (109).

* * * * *